Figure 1:
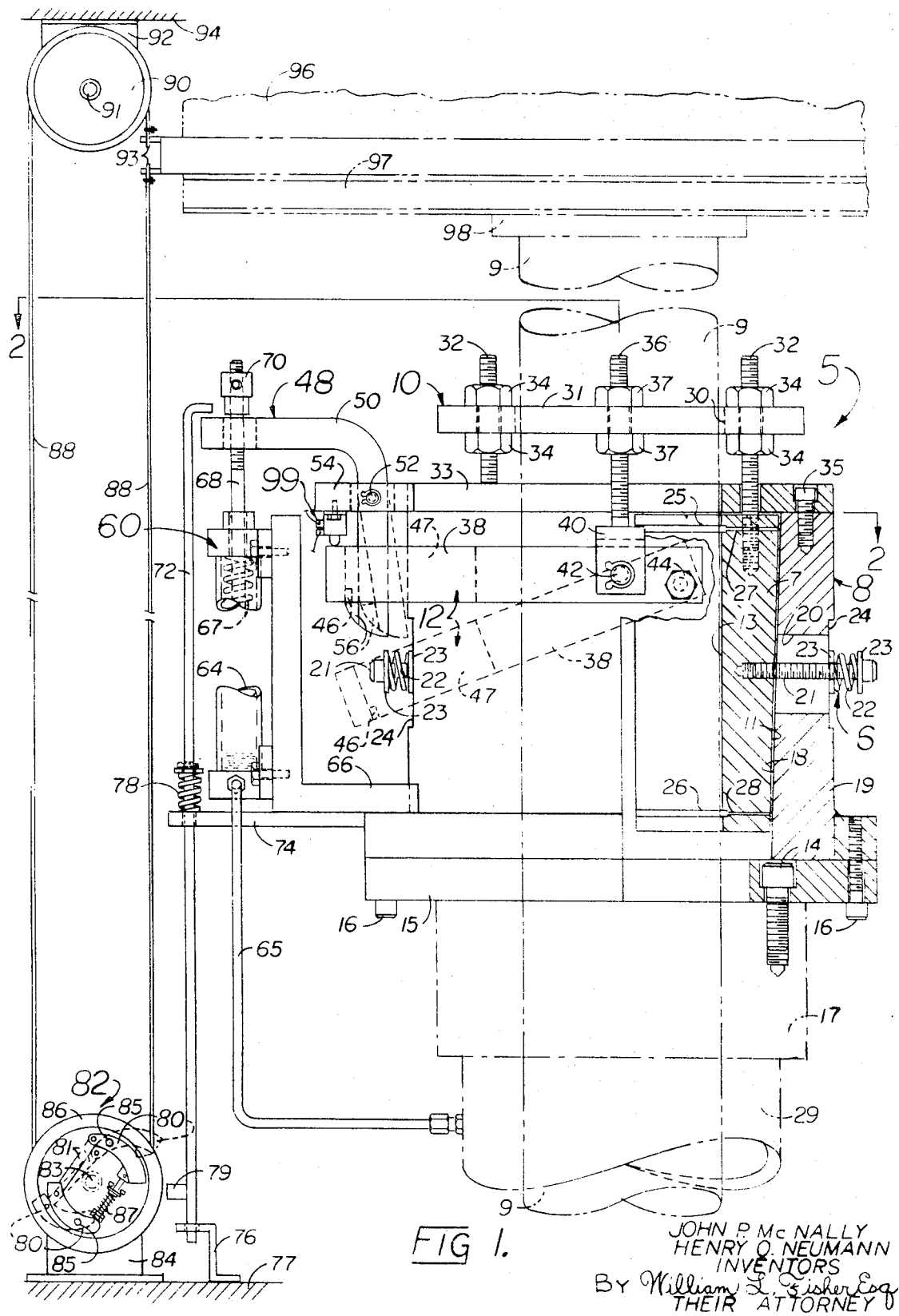

United States Patent [19]

McNally et al.

[11] 3,783,983

[45] Jan. 8, 1974

[54] HYDRAULIC JACK LIFT SAFETY BRAKE SYSTEM

[76] Inventors: John P. McNally, 3336 Duke, Kalamazoo; Henry O. Neumann, Rt. No. 1, Mattawan, both of Mich.

[22] Filed: Jan. 19, 1971

[21] Appl. No.: 107,625

[52] U.S. Cl. .............................. 188/189, 188/188
[51] Int. Cl. .......................................... F16d 59/00
[58] Field of Search ................. 188/182, 186–189

[56] References Cited
UNITED STATES PATENTS

| | | | |
|---|---|---|---|
| 1,905,274 | 4/1933 | Dunlop | 188/188 UX |
| 3,273,671 | 9/1966 | Vrana | 188/188 X |
| 3,327,811 | 6/1967 | Mastroberte | 188/188 X |
| 3,674,116 | 7/1972 | Vogeli | 188/189 X |
| 1,165,583 | 12/1915 | Farmer | 188/189 |
| 1,439,827 | 12/1922 | Lockwood | 188/182 X |
| 2,244,893 | 6/1941 | Panter | 188/188 |
| 2,924,297 | 2/1960 | Brandon | 188/188 X |
| 3,215,231 | 11/1965 | Lodige | 188/189 |
| 3,578,818 | 5/1971 | Eastcott | 188/182 X |

*Primary Examiner*—Duane A. Reger
*Attorney*—William L. Fisher

[57] ABSTRACT

In a hydraulic jack lift safety brake system having a safety brake for braking the downward travel of the jack shaft in the event of a malfunctioning condition in the jack lift system in which at least a pair of tapered brake shoes are driven on a taper during a braking operation to clamp against the jack shaft, improvement in said safety brake comprising an arrangement joining the brake shoes together so that they can be held together in a poised position out of contact with the jack shaft, mechanical advantage mechanism connected to and operative upon the arrangement joining the brake shoes together, a latch operative upon the mechanical advantage mechanism for latching a force against operation except during a braking operation so that the brake shoes are normally held in said poised position, the latch being actuatable to initiate a braking operation in the event of a malfunctioning condition in the jack lift system, and the mechanical advantage mechanism operative upon the brake shoes for driving them during a braking operation with a brake shoe driving force which is multiplied over that which is latched by the latch.

6 Claims, 2 Drawing Figures

JOHN P. McNALLY
HENRY O. NEUMANN
INVENTORS
By William L. Fisher Esq.
THEIR ATTORNEY

HYDRAULIC JACK LIFT SAFETY BRAKE SYSTEM

Our invention relates to hydraulic jack lifts.

Presently hydraulic jack lifts are operated without any safety brake mechanism to brake the load in the event of a malfunction in the system. In our State alone there are thousands of such hydraulic jack lifts in operation without any such safety brake mechanism. In each and every case the jack cylinder is buried in the ground and is susceptible to corrosion, as by electrolytic or galvanic action. Jack cylinders for existing hydraulic jack lifts have been buried in the ground as long as 25 years ago. In this year alone a large automotive manufacturer in out State had two serious elevator accidents from the jack cylinder's rotting out in the ground. Various constructions of jack cylinders have been proposed to minimize the effects of this corrosive action such as double walled jack cylinders and orificed safety bulkheads for jack cylinders (see Joseph U.S. Pat. No. 2,891,635). There is no way to tell which hydraulic jack cylinders should be pulled from the ground and replaced with a new construction jack cylinder and there is no way to tell how long even a new construction jack cylinder will last under such corrosive action. Even after going to the expense of pulling the jack cylinders and replacing them with new construction jack cylinders, and indeed this is a considerable expense, a building owner is still without a safety brake mechanism to protect against other malfunctions unrelated to rotting out of the jack cylinder, such as a leak or rupture in a hydraulic line. Last year the same previously mentioned automotive manufacturer in our State had two other serious elevator accidents, one from a break in a hydraulic line and the other from damage to the packing in the head of the jack cylinder.

The principal object of our invention is to provide an effective safety brake system for hydraulic jack lifts which will arrest the movement of the jack shaft in the event of a malfunction in the hydraulic jack lift system.

Figure 2:
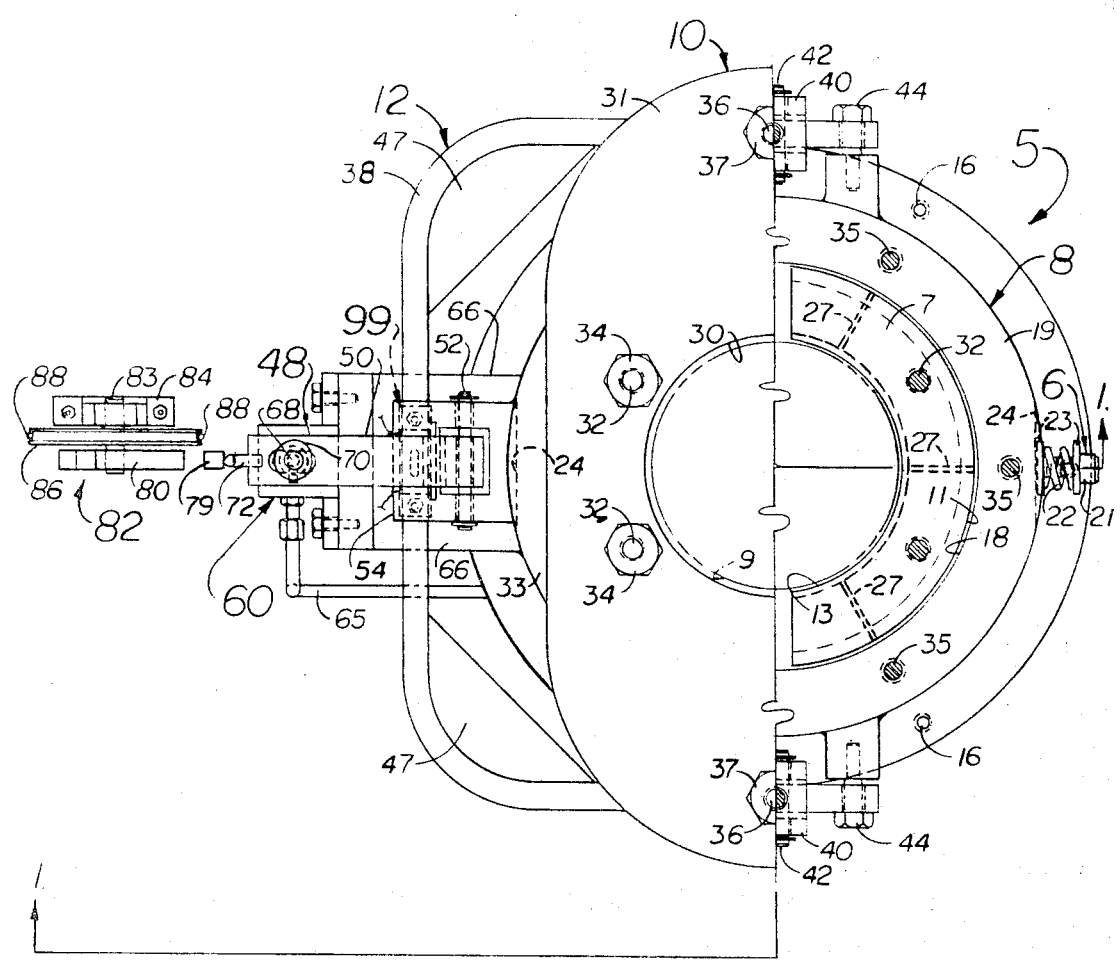

The foregoing object of our invention and the advantages thereof will become apparent during the course of the following description, taken in conjunction with the accompanying drawings, in which:

FIG. 1 is a front elevational view, with parts in section, of a hydraulic jack lift brake system embodying our invention; and FIG. 2 is a top plan view thereof on the line 2—2 of FIG. 1.

Referring to the drawings in greater detail, 5 generally designates said embodiment of a hydraulic jack lift brake system which comprises a brake shoe mechanism 6, a brake shoe holder mechanism 8, a brake shoe lifting mechanism 10, a brake shoe downward driving mechanism 12, and brake initiating means 48.

Said brake shoe mechanism 6 comprises a pair of circumferentially spaced apart non-ferrous brake shoes 7 disposed about the jack shaft of a hydraulic jack lift. Said shoes 7 have frustoconical exterior surfaces 11 and cylindrical interior surfaces 13 corresponding to the cylindrical exterior surface of the jack shaft 9. Said brake shoe holder mechanism 8 is preferably mounted upon the head 17 of a jack cylinder 29 and held stationary thereby in respect to the jack shaft 9. In the instance, a mounting plate 15 is bolted by bolts 14 to said head 17 and said brake shoe holder mechanism 8 is bolted via bolts 16 and a flange fast to the lower end of the body portion 19 to said mounting plate 15. Said body portion 19 has a frusto-conical interior surface 18 corresponding to the frusto-conical exterior surface of the brake shoes 7. A centrally apertured cover plate 33 is provided for the brake shoe holder mechanism 8 and is bolted, as at 35, to the top of the body portion 19. Said shoes 7 operate in said brake shoe holder mechanism 8 and have an elevated poised position therein (shown in full lines in FIG. 1) free of the jack shaft 9 and a lowered brake position in which they choke the jack shaft 9 without damaging the same to arrest its movement. Said body portion 19 is vertically and diametrically slotted, as at 20, for accommodating the movement with the shoes 7 of a shoe pulling mechanism which operates in the slots 20. Said shoe pulling mechanism consists of a pair of horizontal bolts 21 which have their inner ends threaded into the rear walls of the shoes 7 and which carry compression springs 22 operative between washers 23 disposed between the heads of the bolts 21 and flats 24 on the outer wall of the body portion 19. Said shoe pulling mechanism pulls the shoes radially away from the jack shaft 9 during normal operation thereof while permitting them to move downwardly during a braking operation when they are driven by the shoe downward driving mechanism 12. Each shoe 7 is provided with top and bottom annular grooves 25 and 26, respectively, and with drilled radial top and bottom through-apertures 27 and 28 which communicate with the grooves 25 and 26, respectively. The grooves 25 and 26 and apertures 27 and 28 serve as oil wipe means when the brake shoes 7 are being applied to transfer oil from around the jack shaft 9 to the space between the frusto-conical surfaces 11 and 18 to lubricate these surfaces.

Said brake shoe lifting mechanism 10 comprises a centrally apertured, as at 30, plate 31 through which said jack shaft 9 extends. Said plate 31 carries four rods 32, two for each brake shoe, which extend through apertures in said plate 31 and are each vertically adjustable in respect thereto by a pair of locking nuts 34 threadably engaged thereon. The lower ends of each pair of rods 32 are threadably engaged in the upper end of their respective brake shoe 7 for lifting the same when the plate 31 is lifted. The plate 31 is lifted by a pair of rods 36 which extend through apertures in said plate 31 and are each vertically adjustable in respect thereto by a pair of locking nuts 37 threadably engaged thereon. Said plate 31, rods 32 and the pair of rods 36 join the brake shoes together so that they can be held together in a poised position out of contact with the jack shaft. The rods 36 are pivotally mounted on a yoke 38 (which is a part of said shoe downward driving mechanism 12) by means of bifurcated connectors 40 fast on the lower ends thereof and by pivot pins 42 extending through said connectors 40 and through the two side arms of said yoke 38.

Said brake shoe downward driving mechanism 12 comprises said yoke 38 which is pivotally mounted via its said side arms upon said body portion 19 by a pair of pivot pins 44 which are fast to the body portion 19 and extend through the rear ends of said yoke side arms. A cross arm of said yoke 38 is joined to the front ends of said side arms and carries a ledge 46 by which the yoke 38 is held in a cocked elevated position during normal operation of the jack lift. The yoke 38 is weighted, as at 47, to increase the force with which it falls. The yoke 38 is a mechanical advantage means which, via the pair of rods 36, lifts the brake shoes 7 with a force which is multiplied over that which is latched so that during a braking operation said brake shoes 7 are driven with a brake shoe driving force which is said multiplied force. The weights 47 on the latch end of the yoke 38 can be changed to suit factors variable with the particular application such as the weight of the particular brake shoes 7.

Said brake initiating means 48, in the instance, is in the form of a trigger mechanism consisting of a right angled trigger arm 50 pivotally mounted, as by a pivot pin 52, upon a bracket 54 fast to the cover plate 33 which trigger mechanism holds the yoke 38 in its cocked elevated position by means of a ledge 56 on the lower end of the trigger arm 50 which engages and supports the ledge 46 from beneath the latter. Said trigger mechanism can be actuated by a hydraulic mechanism 60 or by a load overspeed mechanism 82, either of which mechanisms 60 or 82 triggers the trigger mechanism 48 by downwardly striking the upper end of the trigger arm 50 which causes the lower end thereof to pivot rearwardly toward the body portion 19 and the ledge 56 to move rearwardly from beneath the ledge 46 resulting in dropping of the weighted front end of the yoke 38 to its lowered braking position all as shown in dotted lines in FIG. 1. Said hydraulic mechanism 60 comprises a hydraulic cylinder 64 supported on a bracket 66 fast to the body portion 19 having its piston rod 68 extending through an aperture in the upper end of the trigger arm 50. The piston rod 68 is urged downwardly by a return spring 67 which operates on the top side of the piston in said cylinder 64 in opposition to hydraulic oil on the bottom side thereof. The hydraulic pressure on the bottom side of said piston is the same as the operating hydraulic oil in the jack cylinder 29 by virtue of a hydraulic oil line 65 which communicates the lower end of the cylinder 64 with the interior of said jack cylinder 29. The free end of the piston rod 68 is threaded and carries a threaded member 70 adjustably fast thereto for striking the upper end of the trigger arm when a loss of hydraulic pressure occurs in the lower end of the cylinder 64. The threaded member 70 is normally backed off from the trigger arm 50 a slight amount, as shown in FIG. 1, to accommodate fluctuations which occur in the operating hydraulic pressure during normal operation of the jack lift. Said load overspeed mechanism 82 comprises a bar 72 supported for vertical sliding movement by an extension bracket 74 fast to the bracket 66 and by a bracket 76 fast to suitable stationary structure 77 in the pit of the elevator shaft which bar 72 has an inturned upper end 73 for striking the upper end of the trigger arm 50 and is urged upwardly by a compression spring 78 which has one end operative against the bracket 74 and the other end fast to the bar 72. The lower end of the bar 72 is provided with a striker plate 79 which is adapted to be struck by one or the other of a pair of moveable weights 80 of a sheave type speed governor mechanism mounted for rotation, as at 83, upon a bracket 84 fast to the structure 77. Said weights 80 which are linked together, as at 81, are individually pivotally supported, as at 85, upon a sheave 86 and fly radially outwardly against the action of a compression spring 87 when the speed of the load exceeds a predetermined safe speed. In the instance the speed governor mechanism is rotatably driven by a cable 88 which passes under the sheave 86 and over another sheave 90 mounted for rotation, as at 91, by a bracket 92 fast to suitable stationary structure 94 in the penthouse of the elevator shaft. A vertical run of the cable 88 is made fast, as at 93, to the load which, in the instance, is an elevator car 96 having the understructure 97 thereof fast, as by a flange 98, to the upper end of the jack shaft 9 so that said speed governor mechanism rotates in proportion to the linear speed of the elevator car 96. The rotational speed at which said speed governor mechanism throws out its weights 80 is adjustable, as by adjusting the compression in the spring 87, and is pre-set in proportion to the rated speed of the elevator car 96 as is well known in the case of car safeties which grip rails in cable elevators.

To de-energize the main hydraulic pump for the hydraulic jack lift when the trigger mechanism 48 is actuated a normally closed pressure switch, such as the pressure switch 99, may be wired in series circuit with the motor for said main hydraulic pump or with the control circuit for said motor. Said pressure switch 99 is disposed, as between the yoke 38 and the bracket 54, so as to be actuated to open position upon falling of the front end of the yoke 38.

In operation of our invention, hydraulic oil from the jack cylinder 29 is allowed to enter the bottom side of the cylinder 64, the load overspeed mechanism 82 is pre-set in respect to the rated speed of the load as described, the yoke 38 is lifted to its elevated cocked position and held therein by arranging the lower end of the trigger arm 50 so that the ledge 56 thereon supports the ledge 46 on the yoke 38 whereupon the brake shoes 7 are lifted into their elevated poised position free of the jack shaft 9 thus permitting normal operation of the jack lift. Should a loss in hydraulic operating pressure occur, as from a ruptured hydraulic line or from rusting out of the buried jack cylinders, the piston 69 will be driven downwardly in the hydraulic cylinder 64 by the spring 67 and the member 70 will strike the upper end of the trigger arm 50 causing it to pivot and its lower end including the ledge 56 thereon to swing rearwardly toward the body portion 19 and away from the ledge 46 whereupon the weighted yoke 38 will fall and drive the plate 31 downwardly which in turn drives the shoes downwardly in the shoe holder mechanism 8 and forces them circumferentially inwardly against the jack shaft 9 to wedge the same to arrest its movement without scoring or marring it in any way.

Falling of the yoke 38 causes the normally closed switch contacts for the pressure switch 99 to be opened which de-energizes the motor driving the main hydraulic pump for the jack lift. As before described the surfaces 11 and 18 are lubricated during the braking operation by transfer of hydraulic oil from around the jack shaft 9 via grooves 25 and 26 and radial apertures 27 and 28 to around the exterior walls of the shoes 7. Should the load overspeed for any reason (either involving or not involving a loss in hydraulic operating pressure), the cable 88 which is fast to the elevator car 96 will cause the sheave 86 to rotate at an overspeed rate and the weights 80 will move out radially so as to strike the striker plate 79 whereupon the bar 72 will be driven downwardly and upper end thereof will strike the upper end of the trigger arm 50 and cause it to trigger the falling of the weighted yoke 38 and hence commence the braking operation as just described. In the event the load overspeeds at the same time that a loss in hydraulic operating pressure occurs the trigger arm 50 will be actuated by the quicker acting of the two sensing mechanisms, i.e., either by the hydraulic mechanism 60 or by the load overspeed mechanism 82.

It will thus be seen that there has been provided by our invention, improvements in hydraulic jack lifts in which the object hereinabove set forth, together with many thoroughly practical advantages, has been successfully achieved. We have successfully tested our hydraulic jack lift brake system on a hydraulic jack lift which had a jack shaft diameter of 3½ inches, a 1-ton load and an operating pressure of 200 psi by rapidly discharging the hydraulic liquid in the jack cylinder 16 so as to cause the hydraulic mechanism 60 to trip the trigger arm 50 via the member 70 and by causing an overspeed load condition by slowly discharging the hydraulic liquid in the jack cylinder 16 so as to cause the load overspeed mechanism 82 to trip the trigger arm 50 via the upper end 73 on the bar 72 and in each instance we were able to brake the jack shaft within 1 inch of downward travel. We repeated these braking operations innumerable times and inspected the jack shaft 9 and found it to be in excellent condition without mar or scoring of any type. While a preferred embodiment of our invention has been shown and described it is to be understood that variations and changes may be resorted to without departing from the spirit of our invention as defined by the appended claims.

We we claimed is:

1. In a hydraulic jack lift safety brake system having safety brake means for braking the downward travel of the jack shaft in the event of a malfunctioning condition in said jack lift system in which at least a pair of tapered brake shoes are driven on a taper during a braking operation to clamp against the jack shaft, improvement in said safety brake means comprising means joining said brake shoes together so that they can be held together in a poised position out of contact with said jack shaft, mechanical advantage means connected to and operative upon said means joining said brake shoes together, latch means operative upon said mechanical advantage means for latching a force against operation except during a braking operation so that said brake shoes are normally held in said poised position, means for actuating said latch means to initiate a braking operation in the event of a malfunctioning condition in said jack lift system, and said mechanical advantage means operative upon the brake shoes for driving them during a braking operation with a brake shoe driving force which is multiplied over that which is latched by said latch means.

2. The improvement as claimed in claim 1, said means for actuating said latch means comprising respective sensing means for simultaneously sensing both the speed condition of the load and the hydraulic operating pressure of said jack lift system, and respective means responsive to each said sensing means for actuating said latch means in the event of either an overspeed condition of the load or a loss in hydraulic operating pressure.

3. The improvement as claimed in claim 2, each said responsive means having direct mechanical connections between the respective sensing means and said latch means for unlatching the latter to initiate a braking operation.

4. In a hydraulic jack lift safety brake system having safety brake method for braking the downward travel of the jack shaft in the event of a malfunctioning condition in said jack lift system in which at least a pair of tapered brake shoes are driven on a taper during a braking operation to clamp against the jack shaft, improvement in said safety brake method comprising joining said brake shoes together so that they can be held together in a poised position out of contact with said jack shaft, latching a first force against operating except during a braking operation, normally holding said brake shoes in said poised position with a second force which is a multiplied force over said first force which is latched, unlatching said first force to initiate a braking operation in the event of a malfunctioning condition in said jack lift system, and driving the brake shoes during a braking operation with a brake shoe driving force which is said second multiplied force.

5. The improvement as claimed in claim 4, simultaneously sensing both the speed condition of the load and the hydraulic operating pressure of said jack lift system, and unlatching the latched force in the event of either an overspeed condition of the load or a loss in hydraulic operating pressure.

6. The improvement as claimed in claim 18, said unlatching taking place directly mechanically from either of the respective sensing actions.

\* \* \* \* \*

UNITED STATES PATENT OFFICE
CERTIFICATE OF CORRECTION

Patent No. 3,783,983          Dated January 8, 1974

Inventor(s) John P. McNally, et al.

It is certified that error appears in the above-identified patent and that said Letters Patent are hereby corrected as shown below:

Column 1, line 14, "out" should read -- our --.

Column 1, line 58, "frustoconical" should read -- frusto-conical --.

Column 5, line 27, "We" should read -- What --; same line "claimed" should read -- claim --.

Column 6, line 27, delete "operating" and insert -- operation --.

Signed and sealed this 14th day of May 1974.

(SEAL)
Attest:

EDWARD M. FLETCHER, JR.         C. MARSHALL DANN
Attesting Officer                 Commissioner of Patents